Figure 1:
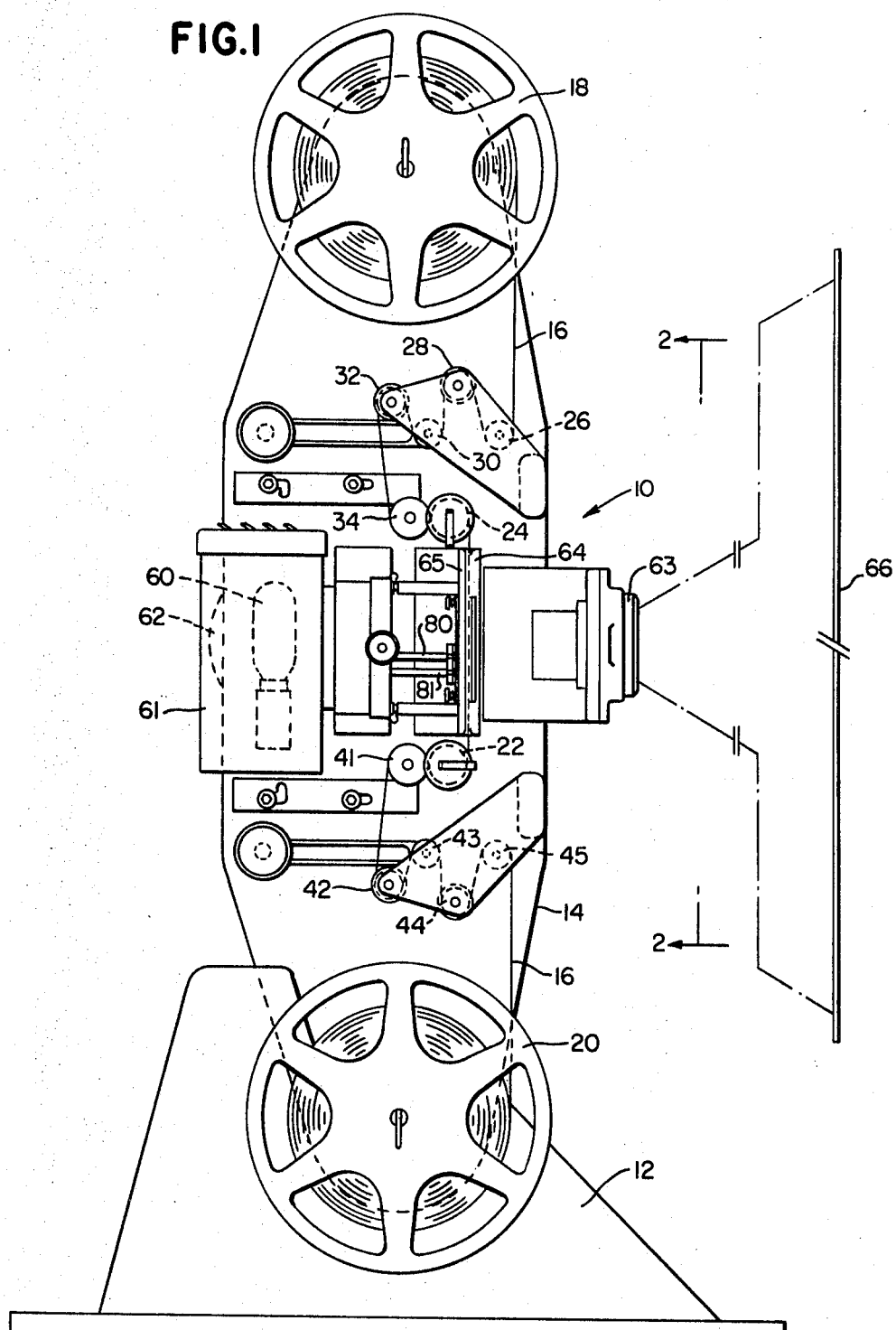

United States Patent

[11] 3,581,964

[72] Inventors Francis A. Betron
Kettering;
Roger W. Morin, Waynesville, both of, Ohio
[21] Appl. No. 810,602
[22] Filed Mar. 26, 1969
[45] Patented June 1, 1971
[73] Assignee The National Cash Register Company
Dayton, Ohio

[54] FILM TRANSPORT MECHANISM
2 Claims, 9 Drawing Figs.

[52] U.S. Cl. .................................................. 226/33,
226/38, 226/43, 226/76
[51] Int. Cl. ................................................ G03b 1/24
[50] Field of Search ....................................... 226/33, 37, 38, 39, 45, 76, 122, 178, 43; 250/219 Rg, 219 F, 227

[56] References Cited
UNITED STATES PATENTS
| | | | | |
|---|---|---|---|---|
| 3,248,029 | 4/1966 | Money | | 226/122X |
| 3,362,601 | 1/1968 | Ford et al. | | 226/122 |
| 3,452,853 | 7/1969 | Mabon | | 226/45X |
| 3,482,229 | 12/1969 | Burr | | 226/122X |
| 3,483,389 | 12/1969 | Cronin | | 250/227X |

*Primary Examiner*—Allen N. Knowles
*Attorneys*—Louis A. Kline, Wilbert Hawk and George J. Muckenthaler ABSTRACT: A transport mechanism for use with either perforated or nonperforated film during its intermittent travel through a camera, projector, or like film-handling machine wherein the mechanism includes means for momentarily slowing the speed of the film prior to stopping the film. The perforated film embodiment utilizes sprocketed rollers for carrying the film, and positioning and detent means for initiating and maintaining control of the film-driving means. The nonperforated film embodiment utilizes clutched rollers for carrying the film, coded film markings, and light means responsive to the position of the film markings during travel of the film for initiating and maintaining control of the film drive means. The speed of the film is reduced from a constant high speed to a constant low speed to enable subsequent stopping at a precise location.

INVENTORS
FRANCIS A. BETRON
ROGER W. MORIN

THEIR ATTORNEYS

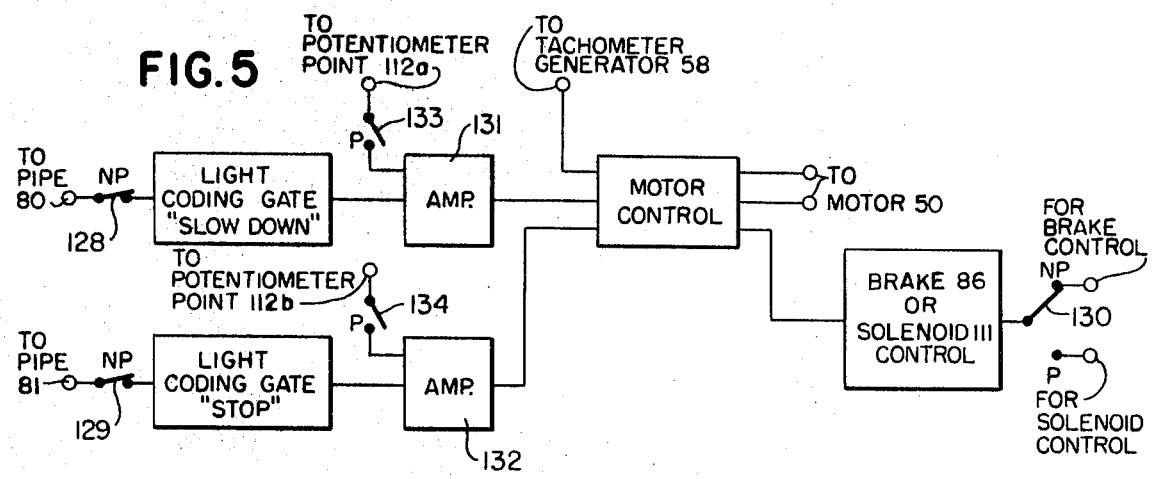
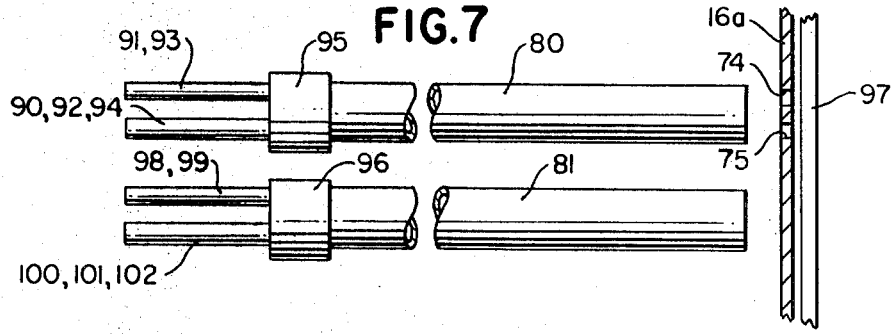
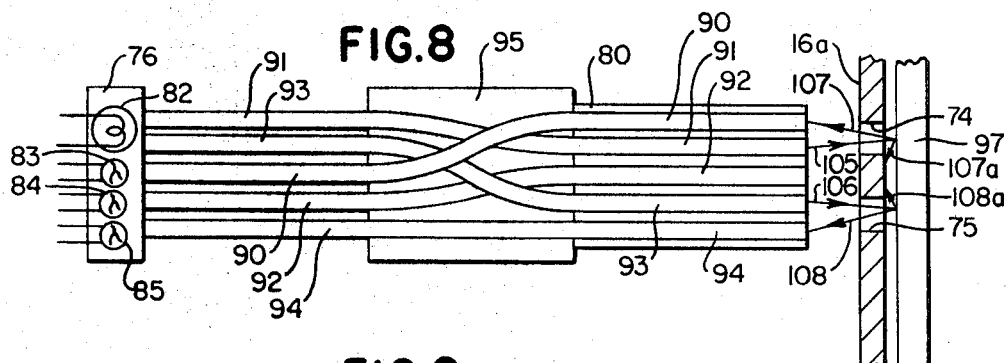
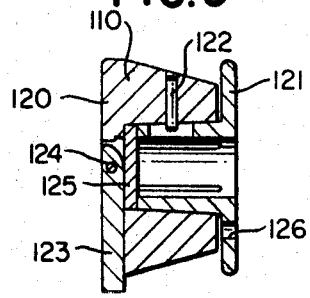

FILM TRANSPORT MECHANISM

BACKGROUND OF THE INVENTION

In the art of transporting film for either exposing, printing, or projecting purposes, generally the film has included spaced apertures along its length, the apertures being positioned to be engageable by sprocket teeth, with the sprockets being the direct driving force to feed the film through the apparatus. In a projector, for instance, the perforated film may be driven in a forward directions, it may be stopped at a desired location, it may be reversed in direction, or it may be set in slow motion during its travel. As the speeds of film transporting have increased for various purposes, there have been problems in the engagement of the driving sprocket teeth with and disengagement of the teeth from the apertures in the film, so that, after a number of runs of the film through the machine, the apertures become frayed or torn at the edges, thereby failing to maintain the precisionlike drive required for transporting the film at these higher speeds. It is, therefore, extremely important, in instances where it is desired to stop at a precise location during its travel, that the driving means be adequate for performing this function, so that, with improved electronic circuitry in the film transport system, the mechanical transport means will be compatible with the environmental controls.

In addition to the perforated film and sprocket roller arrangement, film is being produced in the nonperforated mode, wherein the rollers do not contain sprocket teeth but depend generally upon the frictional engagement between the rollers and the film to drive it. The trend in the industry is toward more use of the nonperforated film; however, transport mechanism to accept both perforated and nonperforated film is necessarily desired for economy and simplicity. The transport mechanism must, of course, be so equipped and controlled that the film can be changed in speed and that it can be started, stopped, reversed, or rewound in the operation of the apparatus utilizing the film. In a projecting machine, for instance, it is often desirable to slow the speed of the film to study each successive frame more thoroughly, to reverse the film to compare current frames with former frames or to repeat the showing of certain frames, or to stop the film to observe details of a certain frame. These operations require precise control of the film position in the machine to gain efficiency ad exactness, especially in the higher speeds of film travel.

Along this line of film control mechanism, the prior art shows, in U.S. Pat. No. 3,148,585, issued Sept. 15, 1964, on the application of Norbert J. Armstrong and William R. Wentz, an automatic apparatus for film printers which uses nonperforated roll film and which apparatus transports the film through the printer and automatically stops the film in the printer each time a negative area on the film is accurately positioned. As the film is being transported, a light-sensitive scanner detects the area of low film density between the negatives on the film, whereupon it energizes a time delay relay, which relay then operates mechanism to stop the film. Additional prior art relating to movement of film by mechanism responsive to character or intensity of light transmitted is shown in U.S. Pat. No. 1,944,024, issued Jan. 16, 1934, on the application of Warren Dunham Foster and Earle L. Parmelee, wherein the film includes spaced markings in the form of black lines or borders for initiating stopping of the film when changing from motion to still projection.

SUMMARY OF THE INVENTION

The present invention relates to a film transport mechanism and more particularly to a machine or other film-handling apparatus which is adaptable for use with perforated or nonperforated film, and wherein either type of film can be momentarily slowed from a constant high speed to a constant low speed prior to stopping of the film at a precise location. The machine or apparatus may be of the type or class including cameras, projectors, camera recorders, or the like which handle the film at varying speeds for the desired results. In the case of the perforated film, the transport mechanism includes sprocketed rollers for driving and for carrying the film through the machine, and positioning means and detent mechanism for controlling the drive means for slowing and for stopping the film. In the case of the nonperforated film, the mechanism includes clutched, smooth rollers for driving and carrying the film, coded film markings, and light-sensitive means for viewing the successive markings on the film to signal the control and drive means for slowing and for stopping the film.

In the present invention, a preferred embodiment shows and describes a projecting machine wherein the film is advanced intermittently therethrough for the purpose of inspecting the condition of the film. The projecting apparatus itself is described as a part of the present invention in so far as the film transport mechanism presents the film in proper sequence and position for observation thereof. The film control is constructed to intermittently drive the film at a constant high speed for the greater portion of each frame and to reduce the rate of travel to a constant lower speed just prior to stopping the film in a precise location for viewing each frame of the film. The intent is to inspect or view the film for its general condition while the machine is running at these higher speeds, yet enable the inspector to obtain the desired results. Therefore, it can be seen that the film must be precisely controlled in the slowing and stopping operations.

As mentioned above, either perforated or nonperforated film may be utilized in the described projecting machine, this being accomplished by the provision of separate control initiation units for determining the time and position of each frame for slowing and stopping the film. In the preferred film control system, a position potentiometer and a detent disc are synchronized with the travel of the film for signaling the control for the driving means and for braking the film drive. In the nonperforated film control system, a source of light is carried through light pipes to the film markings which admit the light onto an adjacent reflector, and the reflected light is transmitted back through the markings and is picked up by detection sensors to signal logic circuits for slowing and stopping the film. The changeover from one to the other type of film in the projector is made by the use of quickly interchangeable sprocketed and smooth drive rollers to accommodate either perforated or nonperforated film.

In view of the above discussion, the principal object of the present invention is to provide a film transport mechanism for momentarily slowing and for stopping the film during its travel through a machine or other film-handling apparatus.

Another object of the present invention is to provide a film transport mechanism capable of driving and carrying perforated or nonperforated film intermittently in its travel through the machine or apparatus.

A further object of the present invention is to provide control initiation means responsive to markings on the nonperforated film for slowing and for stopping the film.

An additional object of the present invention is to provide control initiation means responsive to the extent of travel of the perforated film for slowing and for stopping the film.

Figure 2:
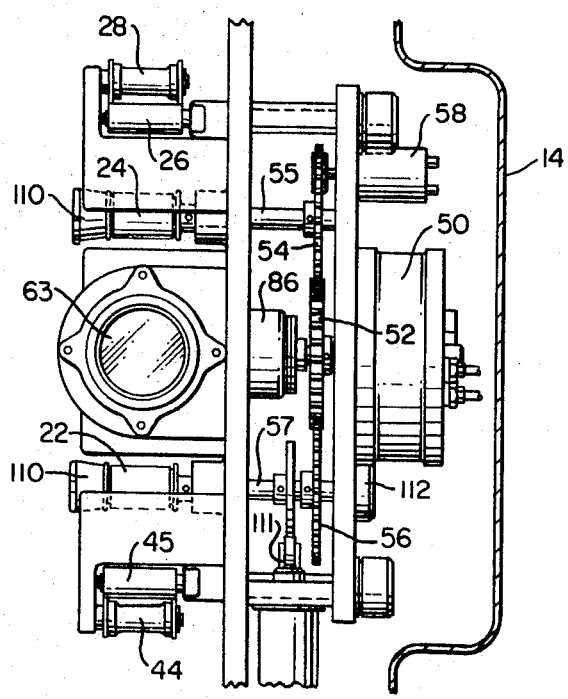
Figure 3:
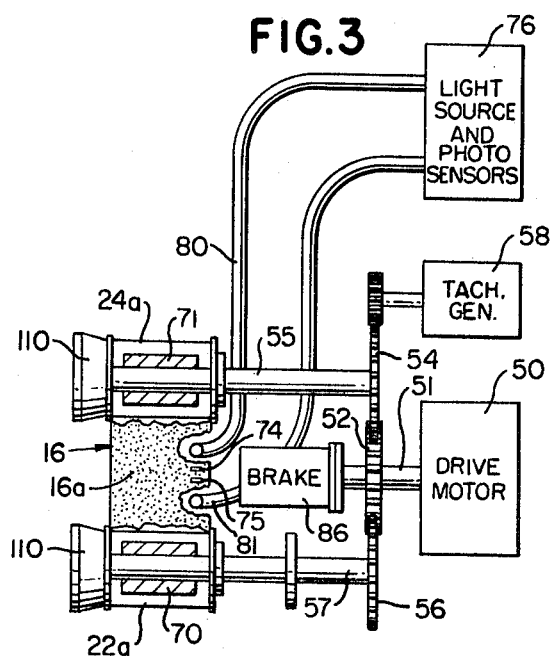
Figure 6:
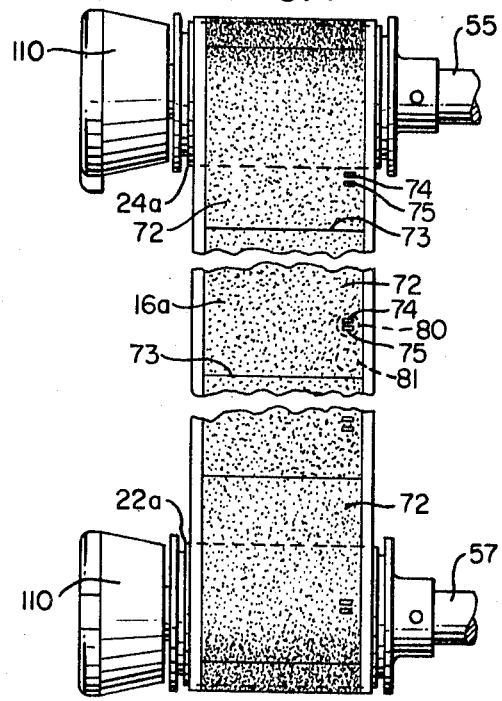
Figure 4:
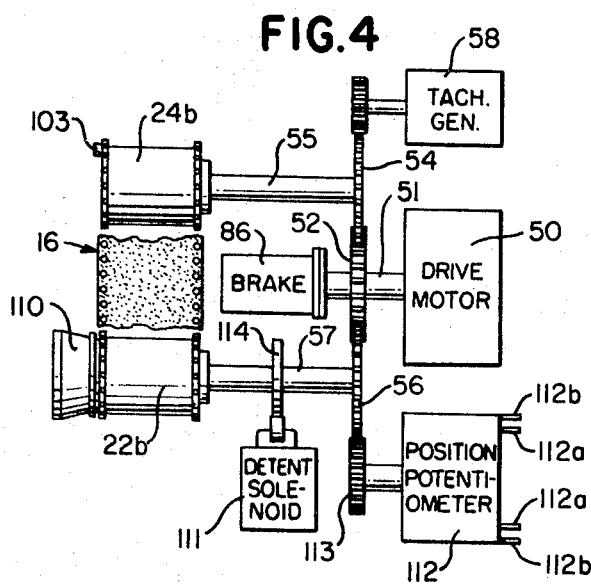

Additional advantages and features of the present invention will become clearly understood from a reading of the following description taken together with the annexed drawings, in which:

FIG. 1 is a side elevational view of a projecting machine incorporating the present invention and showing the path of the film in its travel from one reel to another thereof;

FIG. 2, on the sheet with FIGS. 3, 4, and 6, is a view taken on the line 2-2 of FIG. 1, showing the relationship of the driving and driven members for the film;

FIG. 3, on the sheet with FIGS. 2, 4, and 6, is a diagrammatic representation of the nonperforated film embodiment of the present invention;

FIG. 4, on the sheet with FIGS. 2, 3, and 6, is a view similar to FIG. 3 but showing the perforated film embodiment;

FIG. 5, on the sheet with FIGS. 7, 8, and 9, is a block diagram of the controls for the several embodiments of FIGS. 3 and 4;

FIG. 6, on the sheet with FIGS. 2, 3, and 4, is an enlarged view of a portion of the nonperforated film showing the position of the film movement control points;

FIG. 7, on the sheet with FIGS. 5, 8, and 9, is a diagrammatic view showing the means for initiating control of the nonperforated film;

FIG. 8, on the sheet with FIGS. 5, 7, ad 9, is an enlarged view of the light means for initiating control of the nonperforated film; and FIG. 9, on the sheet with FIGS. 5, 7, and 8, is a sectional view of a drive hub locking assembly used on the machine driving and driven shafts for changing from perforated film to nonperforated film rollers or vice versa.

Referring to FIGS. 1 and 2, there is shown a projection-type machine, designated generally as 10, supported on a base or frame 12, the delicate parts of the machine being protected by a cover 14. Although the invention will be described as useful in this type of machine wherein microfilm is transported from one reel to another, the invention could just as well be used in a film drive control system in cameras and other film-handling machines. FIG. 1 shows the path of the film, designated generally as 16, along a continuous route from an upper supply reel 18 to a lower takeup reel 20, these reels being rotated by suitable and well-known means. In the direction of travel normally considered the forward direction (that is, with the film 16 moving from the supply reel 18 to the takeup reel 20), a driving roller, designated generally as 22, pulls the film through the machine onto the lower reel 20, and a driven roller, designated generally as 24, guides and aids in maintaining proper tension on the film from the upper reel 18. The reels 18 and 20, of course, are rotated through suitable drive means having capabilities of forward and reverse motion for running or for rewinding the film, or adaptable for slow motion or for holding the film in a stopped condition.

Following the path of the film 16 from the supply reel 18 (FIG. 1), it passes under a first movable takeup roller 26, over a first stationary takeup roller 28, under a second movable roller 30, and over a second stationary roller 32. The film then passes under a pinch roller 34 and over the driven roller 24 prior to moving into the projection area of the machine, which area will be described later. The driving roller 22 carries the film from the projection area, with the film passing over a second pinch roller 41, under a third stationary takeup roller 42, over a third movable takeup roller 43, under a fourth stationary roller 44, over a fourth movable roller 45, and thence onto the takeup reel 20. The rollers 26, 30, 43, and 45 act ad idlers and can be adjusted to provide the proper tension on the film in its travel through the machine.

The drive means for the film includes a motor 50 (FIG. 2), which, as best seen in FIGS. 3 and 4, drives a main shaft 51, which carries a driving gear 52 engaging with an upper drive gear 54 carried on an upper drive shaft 55, and also engaging with a lower driven gear 56 carried on a lower driven shaft 57, the gear 54 being connected with a tachometer generator 58. As understood from FIG. 2, the driven roller 24 is carried by the upper shaft 55, while the driving roller 22 is on the lower shaft 57.

Continuing with the description of the projection area, and referring back to FIG. 1, a projection lamp 60 is enclosed in a cover 61, the light being trained through an aperture of the cover by means of a reflector 62 and toward a projection lens 63, all of these parts being positioned on the center of optics, as is well known in the projection art. The film 16 travels in a plane through the projector, between a film guide 64 and a film guide gate 65, these parts, of course, being located between the lamp 60 and the lens 63, the guide 64 and the gate 65 providing a straight surface along which the film travels during the time each frame passes for projection thereof onto a screen or suitable surface 66 placed a distance from the projector 10.

As set out above, FIG. 3 shows the arrangement for nonperforated film, wherein the film is driven by a roller 22a and idly carried on a roller 24a, these designations being given to clutch-type rollers, the surfaces of which frictionally-engageably carry the nonperforated film. The rollers are retained on their respective shafts 55 and 57 by means of drive hub locking assemblies, and contain unidirectional or overrunning-type clutches 70 and 71, of suitable type, for maintaining a precise drive control on the film. In the forward direction of film travel (that is, with the film moving from the reel 18 to the reel 20), the lower roller 22a is the driving member, while the upper roller 24a is free to overrun but, at the same time, maintain the film in a reasonably taut condition.

The nonperforated films, designated specifically as 16a, is shown in greater detail and in frame form in FIG. 6, each frame 72 being separated from adjacent ones by a line 73 to precisely define the extent of area of each frame. Each frame 72 of the film 16a contains coded film markings in the form of windows 74 and 75, one above the other, in the lower right-hand corner of the frame, as viewed from the front of the machine, looking into the lens 63 end of the projector towards the lamp 60 (FIG. 1). These small and shown herein to be rectangular windows 74 and 75 are spaced approximately 0.050 of an inch apart and are generally transparent in relation to the film composition and structure. Since the film 16a is specifically darker in nature, the windows are sufficiently transparent to allow transmission of light means for initiating control of movement of the film through the machine. The spacing of the windows 74 and 75 is deemed important in relation to the means for picking up the light signal, in that the transmission of light means controls the circuitry to first slow and then to stop the film at the desired location in its travel from one reel to the other.

In the nonperforated scheme, the film 16a with its windows 74 and 75 is driven in a path past a pair of light guides or pipes 80 and 81 (FIGS. 3, 6, and 7), which pipes extend from a position adjacent the film in the projecting area to terminal means (not shown) disposed along the lamp cover 61 (FIG. 1). The ends of the light pipes are open to the film, as seen in FIG. 7, and are in line with the windows in the film (FIG. 6). At the terminal end of each light pipe is a source and sensor block 76 (see also FIG. 8), in which are placed a light source 82 and photo detection sensors or reflected light readers 83, 84, and 85, which are connected to the electronic circuitry in the processor or logic mechanism. The electronic circuitry may be standard design components for receiving the light pattern from the photosensors and for programming responses back to the drive motor and incorporated braking means. In this respect, the light 82 is a single lamp which supplies the source light into channels in the pipes, and a respective sensor or photocell is responsive to each of the reflected light patterns in the pipes. The light pipe 80 is designated "slowdown,"and the light pipe 81 is designated "stop," so that, as the film 16a travels past the upper, or slowdown, pipe, the light carried through that pipe comes into play in initiating and effecting a momentary slowing of the film from a constant high velocity to a constant low velocity, and, as the film moves past the lower, or stop, pipe, the light carried through this pipe is effective in initiating mechanism to cause the film to come to a complete stop from the constant low velocity. When the motor 50 receives the signal to stop as a result of the light pattern programmed through the electronic circuitry, a brake 86 (FIGS. 2 and 3) is also actuated to precisely position each frame of the film.

The light pipes 80 and 81 are similar in construction, the diameter of each pipe adjacent the film path being compatible to encircle the area of the windows 74 and 75 (see FIG. 6). As seen in FIG. 8, each pipe is divided into five zones or channels across its interior, these being numbered 90, 91, 92, 93, and 94 (in the case of the slowdown pipe 80) and extending toward the terminal end to a junction 95 for the pipe 80, and a junction 96 for the pipe 81 (see FIG. 7), where the configuration is changed somewhat into two groups. A reflector 97 is positioned on the side of the film opposite the light pipes and is constructed to direct any light from the source back through the windows 74 and 75 as they pass in front of the pipes. Considering the "slowdown" pipe 80, the source of light 82 is directed through the channels 91 and 93, toward the film 16a and the reflector 97, whereas the reflected light is carried through the channels 90, 92, and 94. Adjacent the lamp 82 in the block 76 are the photo detection sensors or photocells 83, 84, and 85, which receive and read the reflected light and then signal the appropriate electronic control circuits to direct the drive means to momentarily slow the movement of the film. Of course, as long as the windows 74 and 75 do not appear in front of the pipes, the film is not altered in speed but continues to move through the machine at a high speed of, for example, 20 inches per second. When the windows appear in front of the "slowdown" pipe 80, the light from the channels 91 and 93 is permitted to be transmitted through the windows, as indicated by light rays 105 and 106 in FIG. 8, which rays strike the surface of the reflector 97 and appear as reflected light rays 107 and 108, which are transmitted back through the channels 90 and 94 to the photocells 83 and 85. The control logic 94 is such that, when there is an indication or pattern of light, dark, and light responses at the photocells 83, 84, and 85, respectively, signals are directed to the control circuits to make a change (in this case, a slowing) in the speed of the film through the machine. Therefore, whenever a light-dark-light pattern appears at the photocells 83, 84, and 85 in the first action of the sequence of intermittent film travel, the drive motor is slowed to momentarily reduce the speed of the film from its normal 20 inches per second to 2 inches per second.

The junction box 95 is provided in the light pipe or guide 80 run to accommodate a slight change in direction of the light channels, so that light from the lamp 82 is cast in proper sequence at the film windows and then reflected back to the reflected-light readers 83, 84, and 85 in proper sequence for initiating the controls for slowing of the film. Similarly, the box 96 is provided in the light pipe or guide 81 run so that channels 98 and 99 carry the source light and channels 100, 101, and 102 return the reflected light to three additional light readers, not shown, for initiating the controls for stopping the film at a precise location. The indication or pattern of light, dark, and light responses, mentioned above, results when the film windows pass either of the light pipes in the position, as representatively shown in FIG. 8 for the "slowdown" pipe 80, for directing a change in the film travel through the machine. This pattern of light must be presented at the reflected light reader block 76 to initiate a change either from the regular velocity or from the reduced velocity of the film. It is seen that a source ray 105 reflects as a ray 107, and a source ray 106 reflects as a ray 108, but that some of the source light rays transmitted through the channels 91 and 93 to the reflector 97 are not reflected back into the channel 92 but reflect back onto the film material 16a between the windows as rays 107a and 108a. Therefore, no light is reflected back to the photocell 84 through the channel 92, thus producing a light-dark-light pattern at the reader block 76. Of course, it is understood that the many rays of source light from the channels 91 and 93 are, for illustrative purposes, herein shown as single rays and also the many reflected rays are shown as single rays entering the channels 90 and 94. The same is true for reflected rays 107a and 108a.

In the perforated film embodiment, the smooth rollers 22a and 24a (FIG. 3) have been replaced with sprocket rollers 22b and 24b (FIG. 4) on the driven shafts 55 and 57, this being accomplished by removing a hub or lock assembly 110 from each such shaft and removing the smooth rollers 22a and 24a, placing the sprocket rollers 22b and 24b thereon, replacing the lock assemblies on the shafts, and switching the required circuits as shown in the diagram in FIG. 5. In this regard, switching the circuits from nonperforated to perforated operation is a relatively simple mechanical change which takes the light means of control out of the system and places a positioning potentiometer means into the system. The lock assembly for the upper sprocket roller 24b is not shown in FIG. 4, in order to show an associated locking pin 103 secured to the roller and extending outwardly to engage with a mating aperture 126 in the hub or lock assembly 110 (FIG. 9), to lock the rollers relative to their respective shafts.

As seen in FIGS. 2 and 4, a position potentiometer 112, having dual points 112a and dual points 112b and driven by means of a gear 113 engaging with the lower driven gear 56, is synchronously driven with a detent disc 114 on the lower shaft 57. The potentiometer has the spaced points at precise angular locations thereon, whereby, for each half-revolution of the potentiometer, the film is advanced one frame, the time elapsed between frames being 150 microseconds. At 150° of revolution of the potentiometer, the motor 50 is signalled (through the electronic circuits by the position of one of the points 112a) to momentarily slowdown from a constant high speed of the 20 inches per second to a constant low speed of the 2 inches per second. Although not shown in detail, the detent disc 114 is provided with two V-shaped recesses, 180° apart, to be engaged by a detent solenoid 111, which also receives its signals from the electronic controls. In this respect, a second position of the succeeding one of the points 112b on the potentiometer, at 180° of revolution, signals the main drive motor to be stopped and the detent solenoid 111 to be actuated into engagement with one of the detent disc recesses, this engagement of the solenoid with the detent disc recess acting as a brake on the driven shaft 57. Subsequent rotation of the potentiometer advances the other of the points 112a to initiate slowing of the drive motor 50 at 300° of rotation, and it follows that, at 300°, the other of the points 112b initiates stopping of the film. Thus, for each rotation of the potentiometer, the film is advanced two frames of intermittent travel through the projector.

The transport mechanism hereof thus accommodates either perforated or nonperforated film, so that one machine, with minor switching, can be utilized for inspecting the condition of either type of film. The film is started through the machine, and, as each frame appears, the film is slowed down and then stopped for the inspection, this operation being repeated for each frame.

The drive hub or locking assembly 110 is constructed to be easily removed and replaced when changing from one type of film to the other. As seen in FIG. 9, the assembly includes a female collar element 120, a male collar element 121 secured slidably within the element 120 by a pin 122, and a cam lever 123 pivoted on a pin 124 on the female element to lock the parts on the shaft. A locking disc 125 adjacent the inner end of the male collar 121 is pressed against the end thereof by the cam lever 123 to shift the male collar 121 and thereby lock the particular roller being used into position on the shaft. As understood from FIGS. 4 and 9, the locking pin 103 of the roller employed engages with the aperture 126 in the flange of the male collar element 121 to properly locate and lock the roller in relation to its respective shaft. The smooth rollers 22a and 24a, for the nonperforated film 16a, do not require synchronization with the shafts 55 and 57, as do the sprocketed rollers, because the film can be advanced slightly to properly position the markings 74 and 75 thereof in relation to the light guides 80 and 81. On the other hand, when the sprocketed rollers 22b and 24b are installed for perforated film, they are keyed on the respective shafts to agree with the point position on the potentiometer, and, of course, the apertures in the film must be mated with the teeth on the sprockets.

FIG. 5 shows a simplified block diagram of the basic controls for the several embodiments, these being the perforated film (P) and the nonperforated film (NP). The switches 128, 129, and 130 are shown in the position for accommodating the NP film, so that the NP circuit is picked up by means of the reflected light through the film-coding gates or windows, the photocells read the reflected light pattern, and the light signals are carried to amplifiers 131 and 132 to be transmitted to the logic circuit for the motor control, this circuitry also causing the application of the brake 86 on the main drive to stop the film at the desired positions in its travel through the machine.

When the P film is to be transported through the machine, the switches 128 and 129 are opened, the switches 133 and 134 are closed, and the switch 130 is thrown to the P position, thus taking the film-coding window and the light means control out of the circuit. The signals are also carried through the amplifiers 131 and 132 to the motor control and the solenoid control 111, where, with the switch 130 in the P position, the control is taken over by the respective points on the position potentiometer 112. The change from P to NP film or vice versa is thereby accomplished by simple mechanical switching of the circuits.

It is thus seen that herein shown and described is a film transport mechanism for use in inspecting the condition of either perforated or nonperforated film, which mechanism accomplishes all the objects and features of the invention. While specific embodiments covering the two types of commonly used film are disclosed, variations on these may occur to those skilled in the art, so it is contemplated that all such variations are within the scope of the invention.

It is claimed:

1. A film transport apparatus adaptable for use with perforated or nonperforated film in a machine having feed and takeup reels, and means for controlling the film in intermittent travel in its path from one to the other reel, including a drive motor, a film-driving roller and a film driven roller connected to the drive motor, first position means including a driven potentiometer having first points thereon responsive to travel of the film for signaling the drive motor to slow the speed of the rollers carrying the film, and second position means comprising second points on the driven potentiometer responsive to further travel of the film for signaling the drive motor to stop the rollers and the film.

2. A film transport apparatus adaptable for use with perforated or nonperforated film in a machine having feed and takeup reels, and means for controlling the film in intermittent travel in its path from one to the other reel, including a drive motor, a film-driving roller and a film driven roller connected to the drive motor, the driving and driven rollers frictionally engaging the film and having clutches for maintaining the driving force on the film in one direction, first position means having light-oriented elements spaced to respond to film travel for signaling the drive motor to slow the speed of the rollers carrying the film, and second position means having light-oriented elements spaced to respond to further travel of the film for signaling the drive motor to stop the film.